Sept. 25, 1934.    R. C. CAUGHEY    1,974,410
MOWER
Filed March 17, 1934
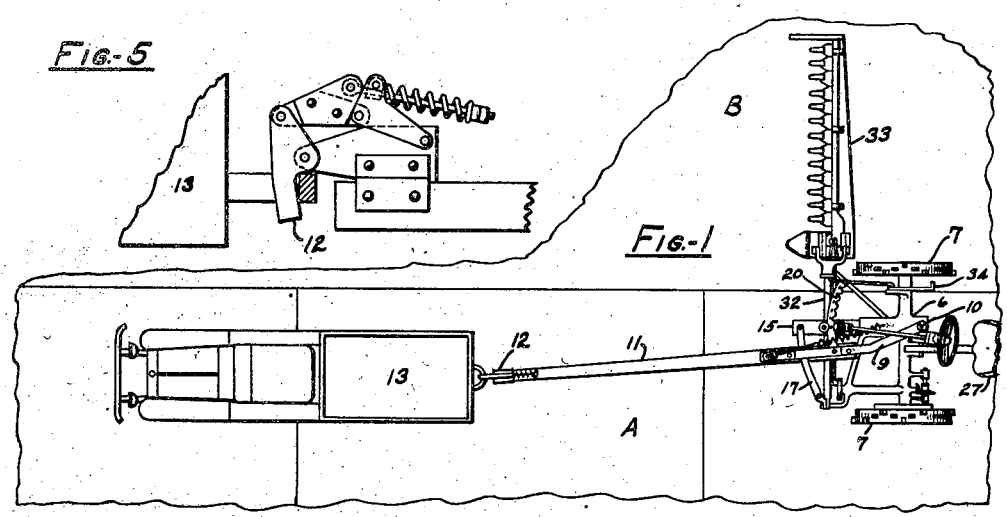
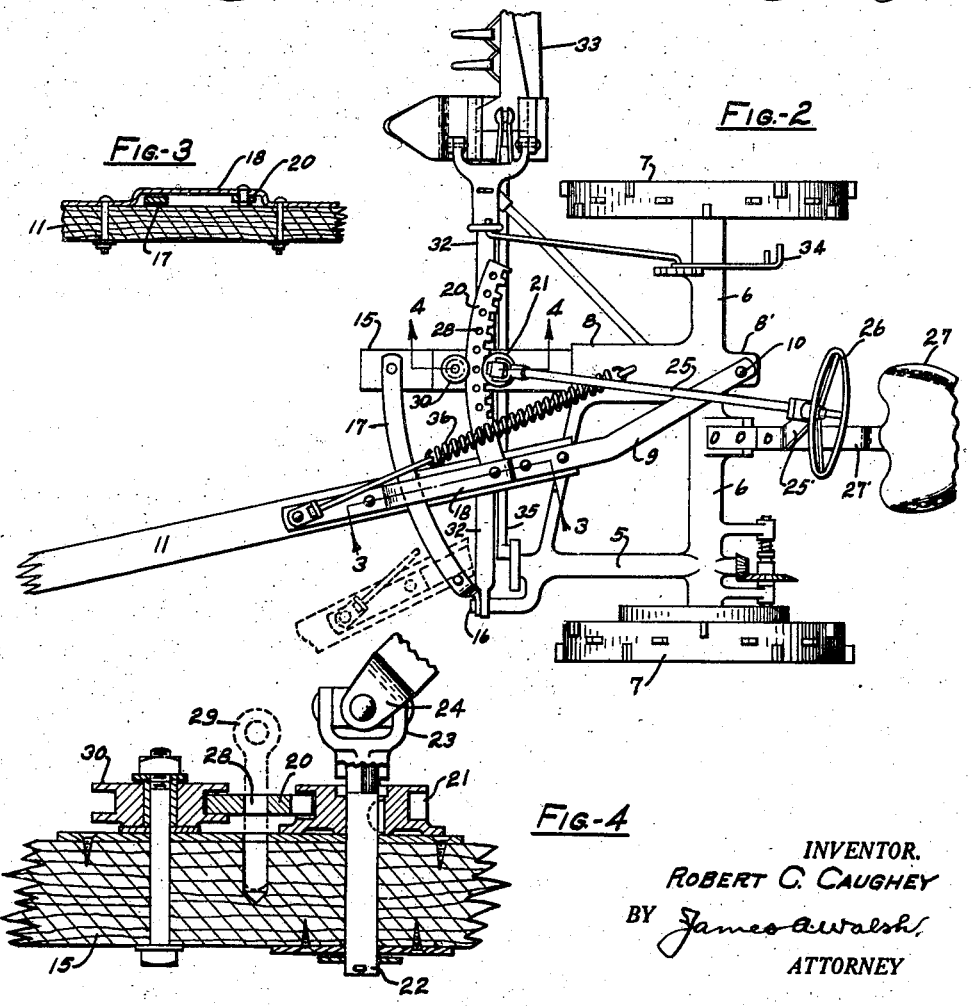
INVENTOR.
ROBERT C. CAUGHEY
BY James A. Walsh
ATTORNEY Patented Sept. 25, 1934

1,974,410

UNITED STATES PATENT OFFICE 1,974,410

MOWER

Robert C. Caughey, Rockford, Ill., assignor to J. I. Case Company, Racine, Wis., a corporation Application March 17, 1934, Serial No. 716,055

9 Claims. (Cl. 56—218)

My invention relates to mowers of the type particularly adapted for mowing grass and weeds alongside highways, in which work it is of advantage to provide instantly controlled and efficient steering mechanism readily operable by an attendant on the mower to meet rapidly changing conditions due to slopes, ditches, obstructions and other irregularities, and which mower is commonly drawn along the edge of paved roads by a motor vehicle, as a truck or tractor, at all times on the road, while the cutting mechanism of the mower is extended laterally along the turf for performing mowing operations, the mower being trailed in offset relation to the power vehicle. The movement of the mower may be constantly varied in lateral directions by the attendant to meet changing conditions as the vehicle continues in a straight line, or which mower may be locked in a predetermined position and guided by the vehicle operator who may steer the vehicle so that the mower will clear obstructions, and in which latter condition the mower operator is dispensed with. My improvement is of especial advantage, when an attendant is guiding the mower, in avoiding contact with culverts, stumps and other obstructions, as the operator is enabled to readily guide the cutter-bar to cut closely to and avoid such obstructions, which is not practical, so far as I am aware, when it is necessary to elevate the cutter-bar, as is common.

In the accompanying drawing, forming part hereof, Figure 1 is a plan view of a connected truck and mower showing the relation thereof to a highway and roadside; Fig. 2, an enlarged plan of a mower embodying my improvement; Fig. 3, a detail section taken on the dotted lines 3—3 in Fig. 2; Fig. 4, a detail section taken on the dotted lines 4—4 in Fig. 2; and Fig. 5 is a detail of the means for releasably connecting the mower tongue and truck.

In said drawing, the numeral 5 indicates the mower frame including a bearing 6 in which an axle is mounted for supporting the wheels 7, but as said parts and common details of construction not illustrated are no part of my present invention they will be referred to but incidentally in describing my improvements.

The frame structure 5 includes an extension 8, 8', positioned forwardly and rearwardly of the axle, to which an angulated tongue 9 is pivotally connected, at 10, its forward extension 11 being provided with a spring-controlled slip coupling, as 12, but which may be of any suitable character adapted to be releasably connected to a vehicle 13 so that the mower will be disconnected when striking obstructions.

The stub-tongue 15 is mounted on the frame extension 8, and connected to the frame, at 16, and to the stub-tongue is a guide 17 passing beneath a strap 18, Fig. 3, on the tongue portion 11, whereby the mower is sustained in its lateral movements. A rack-bar 20 is pivotally connected to tongue 11 and extends across the stub-tongue, its teeth engaging a pinion 21 supported on the stub by shaft 22 connected by a universal joint 23—24 to a steering-rod 25 having an operating wheel 26 at its upper end within reach of an attendant occupying the seat 27 on the mower, said rod being supported in a bracket 25' on the seat-post 27' or otherwise secured. The rack-bar 20 is provided with perforations 28 for the reception of a pin 29 adapted to pass into the stub, for a purpose to appear, and which bar is held in position and guided during its lateral movements by a guide-roller 30. The mower, as usual, includes a coupling-bar 32 to which a cutter-bar 33 is adjustably connected and controlled by a lever 34, and which cutter-bar is actuated by a pitman 35 of desired construction, as is common, actuated by a gear system associated with the driving-wheel of the mower.

In operation, as indicated in Fig. 1, the power vehicle 13 is steered along the road A, with the mower in offset relation thereto, so that the cutter-bar 33 will move along the roadside B, and, when in unlocked condition by removing pin 29, the attendant by manipulating steering-wheel 26 to actuate pinion 21 may adjust the mower laterally as desired upon its pivotal connection 10 with the tongue portion 9, so that when about to encounter obstructions in either even or irregular ground the mower may be instantly adjusted laterally and inwardly in relation to the road, whereby the cutter-bar will avoid an obstruction and be as readily returned instantly to its normal course, and during which adjustments the side draft of the cutter-bar will be counteracted by the resistance of the mower wheels so that the mower will be maintained in parallel relation to the roadside, the lateral movements of the tongue extension 11 being assisted by a tension spring 36 connecting the frame and tongue, as indicated in Fig. 2. The novel manner of pivotally connecting the angulated tongue rearwardly of the axle, and flexibly connecting its forward end to the truck, is of importance in that such arrangement positively maintains the vehicle and the mower in substantially the aligned relation indicated in Fig. 1, and that when the cutter-bar is moved inwardly for an instant when avoiding an obstruction any slight misalignment of the mower may be quickly rectified by manipulating the steering-rod, as will be readily understood.

I claim as my invention:

1. In a mower having a frame including an axle bearing, a tongue pivotally connected to the frame rearwardly of the axle, a stub-tongue supported by the frame, a guide connected to the stub-tongue and the frame upon which said tongue is movably mounted, a rack-bar connected to the tongue, a pinion on the stub-tongue engaging the rack-bar, and steering mechanism associated with the pinion for actuating the latter to laterally adjust the mower.

2. In a mower having a wheeled frame, an angulated tongue pivotally connected to the rear portion of the frame, a stub-tongue fixedly secured to and extending from the frame, a rack-bar connected to the tongue and extending across the stub-tongue, means on the stub-tongue for guiding the rack-bar, and steering mechanism engaging the rack-bar and adapted to laterally adjust the mower.

3. In a mower having a wheeled frame, a tongue pivotally connected at its rear end to the frame, means on the opposite end of the tongue for releasably connecting it to a prime mover, a stub-tongue fixedly secured to the frame, a rack-bar connected to the tongue, and steering mechanism on the stub-tongue engaging the rack-bar and adapted to laterally adjust the mower.

4. In a mower having a wheeled frame including an axle bearing, a tongue pivotally connected to the frame adjacent said bearing and adapted to be releasably connected at its opposite end to a prime mover and to maintain the mower in offset relation to the latter, cutting mechanism on the mower and extending laterally therefrom, steering mechanism on the frame, and means associated with the tongue and engageable with the steering mechanism whereby the latter may be actuated to adjust the mower so that its cutting mechanism will avoid obstructions in its path of travel.

5. In a mower having a wheeled frame, a tongue pivotally connected to the frame, a stub-tongue supported on the frame, a pinion mounted on the stub-tongue, a guide-roller on the latter, a rack-bar on the tongue slidably mounted between the pinion and guide-roller and engaged by the pinion, a universal joint associated with the pinion, a steering-rod connected to said joint for actuating the pinion to laterally adjust the mower, and yielding means connecting the frame and tongue for controlling the lateral movement of the mower.

6. In a mower having a wheeled frame, a tongue pivotally connected at its rear end to the frame and adapted to be connected at its opposite end to a prime mover and to maintain the mower in offset relation to the latter, a rack-bar on the tongue, steering mechanism on the frame engaging the rack-bar and adapted to laterally adjust the mower, and means for locking the rack-bar to prevent lateral adjustment of said mower.

7. In a mower having a frame, an angulated tongue having its rear end pivotally connected to the frame to swing horizontally, means extending from the tongue in transverse relation to the frame, and steering mechanism on the frame engaging said transverse means for adjusting the mower in lateral directions.

8. In a mower, a frame including a forwardly extending member, a guide mounted on the frame, a tongue pivotally connected to the frame and extending through and supported by the guide, a rack-bar on the tongue and extending across the extension member, and steering mechanism on the frame engaging the rack-bar to swing the tongue through the guide.

9. In a mower having a frame, a tongue pivotally connected adjacent the rear portion of the frame, adjusting means extending from the tongue in transverse relation to the frame, steering means on the frame operatively engaging the adjusting means for shifting the mower in lateral directions, and yielding means connecting the frame and tongue for controlling the lateral movement of the latter.

ROBERT C. CAUGHEY.